United States Patent
Schmidt et al.

(10) Patent No.: US 12,506,926 B2
(45) Date of Patent: Dec. 23, 2025

(54) HLS LIVE SEAMLESS RESUME FROM PAUSE

(71) Applicant: ARRIS ENTERPRISES LLC, Suwanee, GA (US)

(72) Inventors: Mark S. Schmidt, San Diego, CA (US); Virendra Singh, Bangalore (IN); Senthilkumar Muthukrishnan, Bangalore (IN); Harish Doddasinkere Chikkamanchaiah, Mandya District (IN)

(73) Assignee: Thomson Licensing, Cesson-Sevigne (FR)

( * ) Notice: Subject to any disclaimer, the term of this patent is extended or adjusted under 35 U.S.C. 154(b) by 135 days.

(21) Appl. No.: 18/378,690

(22) Filed: Oct. 11, 2023

(65) Prior Publication Data

US 2024/0129596 A1    Apr. 18, 2024

Related U.S. Application Data

(60) Provisional application No. 63/416,704, filed on Oct. 17, 2022.

(51) Int. Cl.
*H04N 21/433* (2011.01)
*H04N 21/2343* (2011.01)
(Continued)

(52) U.S. Cl.
CPC . *H04N 21/4333* (2013.01); *H04N 21/234309* (2013.01); *H04N 21/2387* (2013.01);
(Continued)

(58) Field of Classification Search
CPC ....... H04N 21/4333; H04N 21/234309; H04N 21/2387; H04N 21/4331; H04N 21/6587; H04N 21/8456
See application file for complete search history.

(56) References Cited

U.S. PATENT DOCUMENTS 9,491,521 B2    11/2016    Mangalore et al.
10,044,466 B2    8/2018    Schmidt et al.
(Continued)

FOREIGN PATENT DOCUMENTS

CN    112218165 A   *   1/2021   ....... H04N 21/47202
WO   WO-2015109462 A1  *  7/2015   ........... H04L 65/612

*Primary Examiner* — John R Schnurr
(74) *Attorney, Agent, or Firm* — Panitch Schwarze Belisario & Nadel LLP

(57) ABSTRACT

A method, apparatus, and computer program product for trickplay in HTTP live streaming (HLS), includes: establishing a connection to a content source; receiving a piece of content from a content source as a multimedia stream, wherein the multimedia stream comprises a digital living network alliance stream; converting the multimedia stream into a client stream that comprises a HLS stream, the HLS stream including a manifest file containing a plurality of transport stream packets; storing a pre-determined number of the plurality of transport stream packets in a temporary storage; outputting the client stream to a media player; receiving a first trickplay request from the media player, the first trickplay request being a pause request; in response to the first trickplay request: pausing the client stream; transmitting a signal keeping the connection to the content source alive and the multimedia stream active; and storing the multimedia stream in the temporary storage.

30 Claims, 8 Drawing Sheets

(51) Int. Cl.
    *H04N 21/2387*     (2011.01)
    *H04N 21/6587*     (2011.01)
    *H04N 21/845*      (2011.01)

(52) U.S. Cl.
    CPC ..... *H04N 21/4331* (2013.01); *H04N 21/6587* (2013.01); *H04N 21/8456* (2013.01)

(56) References Cited

U.S. PATENT DOCUMENTS

| | | | |
|---|---|---|---|
| 10,136,193 B2 | 11/2018 | Chen et al. | |
| 2013/0290402 A1* | 10/2013 | Gavade | H04N 21/4586 709/217 |
| 2014/0270161 A1* | 9/2014 | Shamsaasef | H04N 21/4405 386/259 |
| 2014/0380352 A1* | 12/2014 | Mangalore | H04N 21/4181 725/31 |
| 2014/0380376 A1* | 12/2014 | Schmidt | H04N 21/4385 725/54 |
| 2016/0182973 A1* | 6/2016 | Winograd | H04N 21/8358 725/25 |
| 2016/0205164 A1* | 7/2016 | Schmidt | H04N 21/8456 709/219 |
| 2016/0295303 A1* | 10/2016 | Srinivasan | H04N 21/23424 |
| 2016/0323653 A1* | 11/2016 | Chen | H04N 21/23439 |
| 2017/0019445 A1* | 1/2017 | Panje | H04L 65/80 |
| 2017/0064409 A1* | 3/2017 | Westerhoff | H04N 21/8455 |
| 2017/0339437 A1* | 11/2017 | Lee | H04N 21/2383 |
| 2022/0264189 A1* | 8/2022 | Rathi | H04N 21/437 |
| 2023/0209105 A1* | 6/2023 | Kozak | H04N 21/25841 725/93 |
| 2023/0291979 A1* | 9/2023 | Bhat | H04N 21/23439 |

\* cited by examiner

HLS LIVE SEAMLESS RESUME FROM PAUSE

TECHNICAL FIELD

The present invention relates generally to a method, an apparatus, and a computer program product for trickplay in HTTP Live Streaming (HLS), and more particularly to enabling a seamless resume of an HLS media stream from a pause position.

BACKGROUND

In current HLS streaming, a problem is known to occur during live streaming for a converted digital living network alliance (DLNA)-to-HLS playback on media devices (e.g., iOS and tvOS devices) when the user pauses the HLS video for some time duration and then attempts to resume playback at a later time. Particularly, when a user resumes a paused DLNA-HLS converted media stream, the playback is observed to restart from a current live position instead of continuously from the paused position. For example, if a user pauses a converted DLNA-HLS media stream at X minutes and resumes the media stream after, e.g., two minutes, the media stream is expected to restart playing from X minutes; however, in current systems, the media stream is observed to restart from X+2 minutes, e.g., at the live point 2 minutes (the duration of the pause) past the paused position. Thus, in current systems, users miss a chunk of the playback of a converted DLNA-HLS media stream upon resuming the media stream from a pause position. A current solution to the above-noted converted DLNA-HLS media stream resume problem includes saving the pause position of the media stream, sending the pause position value to a server, waiting until the server stops sending data from the live point and restarts sending audio/visual data from the pause position, receiving and processing the video data on a client and, sometimes if the client (or server) session closes, e.g., due to a timeout during this process, restarting the player at the client side. This known process has been observed to cause significant delay due to system processing and network transmission overhead. For example, in current video media server (VMS) set-top-boxes, the process can take 5 to 6 seconds or more. Thus, a user must wait about a significant time, e.g., 5 seconds after initiating a resume trickplay for the media stream to resume, which reduces the quality of experience relative to other streaming services. Thus, there is a need for a technical solution for improved playback of a converted DLNA-HLS media stream from a pause position.

SUMMARY

The present disclosure provides a description of exemplary methods, systems, and computer program products for trickplay in HLS.

A method for trickplay in HTTP live streaming (HLS) includes: establishing a connection to a content source; receiving a piece of content from a content source as a multimedia stream, wherein the multimedia stream comprises a digital living network alliance stream; converting the multimedia stream into a client stream, wherein the client stream comprises a HLS stream, the HLS stream including a manifest file containing a plurality of transport stream packets; storing a pre-determined number of the plurality of transport stream packets in a temporary storage; outputting the client stream to a media player; receiving a first trickplay request from the media player, the first trickplay request being a pause request; in response to the first trickplay request: pausing the client stream; transmitting a signal to the content source, the signal keeping the connection to the content source alive and the multimedia stream active; and storing the multimedia stream in the temporary storage A apparatus for trickplay in HTTP live streaming (HLS) includes an interface configured to: establish a connection to a content source; receive a piece of content from a content source as a multimedia stream, wherein the multimedia stream comprises a digital living network alliance stream; and one or modules configured to: convert the multimedia stream into a client stream, wherein the client stream comprises a HLS stream, the HLS stream including a manifest file containing a plurality of transport stream packets; store a pre-determined number of the plurality of transport stream packets in a temporary storage; output the client stream to a media player; receive a first trickplay request from the media player, the first trickplay request being a pause request; in response to the first trickplay request: pause the client stream; transmit a signal to the content source, the signal keeping the connection to the content source alive and the multimedia stream active; and store the multimedia stream in the temporary storage.

A computer program products for trickplay in HTTP live streaming (HLS) includes: a computer-readable storage medium having program instructions embodied therewith, the program instructions executable by a computer to cause the computer to perform a method including: establishing a connection to a content source; receiving a piece of content from a content source as a multimedia stream, wherein the multimedia stream comprises a digital living network alliance stream; converting the multimedia stream into a client stream, wherein the client stream comprises a HLS stream, the HLS stream including a manifest file containing a plurality of transport stream packets; storing a pre-determined number of the plurality of transport stream packets in a temporary storage; outputting the client stream to a media player; receiving a first trickplay request from the media player, the first trickplay request being a pause request; in response to the first trickplay request: pausing the client stream; transmitting a signal to the content source, the signal keeping the connection to the content source alive and the multimedia stream active; and storing the multimedia stream in the temporary storage.

BRIEF DESCRIPTION OF THE DRAWINGS

The scope of the present disclosure is best understood from the following detailed description of exemplary embodiments when read in conjunction with the accompanying drawings. Included in the drawings are the following figures.

Figure 1:
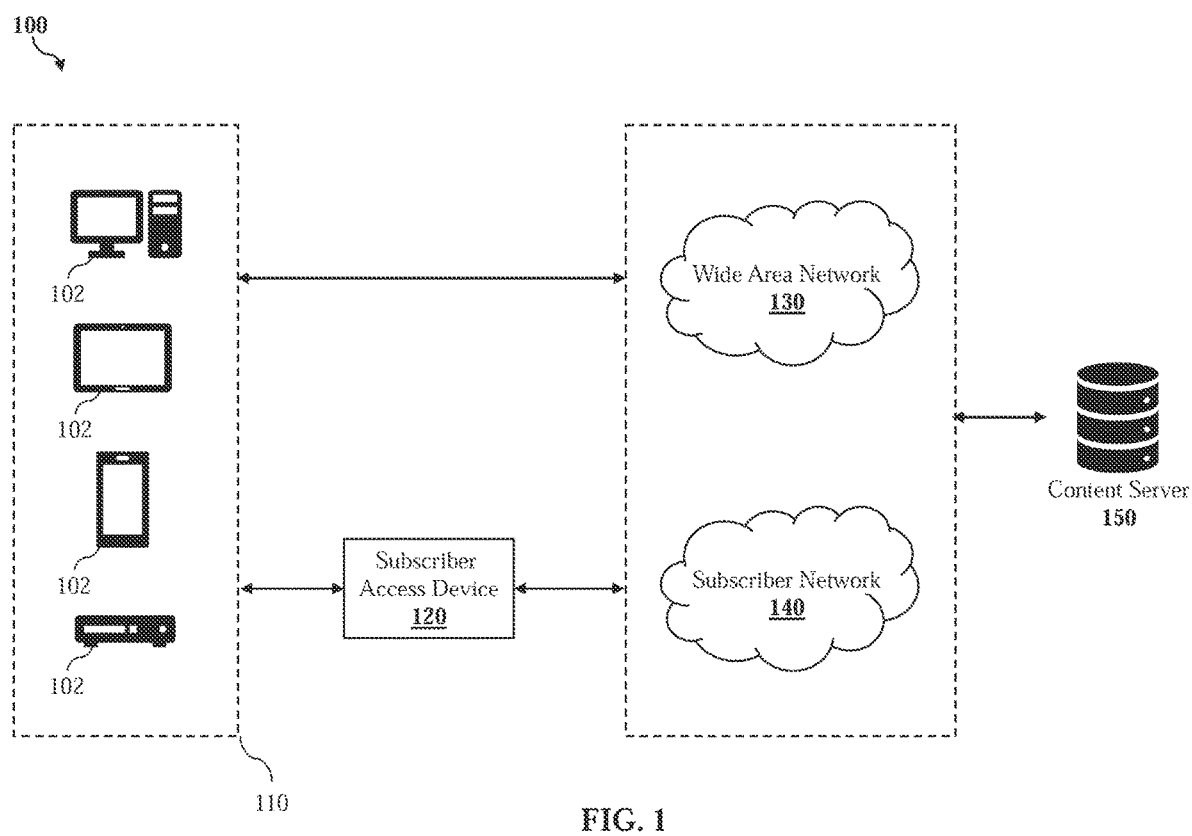
FIG. 1 is a block diagram illustrating a high-level system architecture for trickplay in HLS in accordance with exemplary embodiments.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure

DETAILED DESCRIPTION

The present disclosure provides a novel solution for seamless playback of an HLS media stream from a pause position. The present disclosure is related to video streaming to client devices in which client users can watch an uninterrupted media stream after resuming from a paused position, which improves the user experience on media devices and in particular mobile media devices. The present disclosure utilizes and improves upon the DLNA-to-HLS trickplay implementation described in U.S. Pat. No. 10,136,193, entitled "Supporting Trickplay of Streaming DLNA Multimedia By HLS Access Device" filed Apr. 28, 2016, herein incorporated by reference in its entirety, that entails an iOS client-side conversion of continuous DLNA HTTP/TCP MPEG2 transport stream data to HLS format for playback in the native AVPlayer on an iOS device. As discussed above, current technologies either fail to resume a converted DLNA-HLS media stream from a pause position (e.g., by restarting instead to a live position), or require an unacceptable waiting period before playback from the pause position is initiated. While the example of a DLNA-HLS media stream is discussed throughout, it can be appreciated that the disclosed methods, systems, and computer program products may also be utilized for HLS streaming, e.g., HLS server to HLS client, or any other suitable media streaming formats including their respective file transport protocols, e.g., HLS container format for HLS Streaming, etc. The methods, systems, and computer program products herein provide a novel solution, not addressed by current technology, to resume playback of a live or recorded HLS media stream from a pause position by sending an HLS manifest as a live "sliding-window" type manifest (e.g., a manifest without an end list tag). In this approach, a server need not maintain different manifests for live and recorded contents. Exemplary embodiments of the methods, systems, and computer program products provided for herein are applicable to any type of client for mobile and desktop media streaming. Also, exemplary embodiments of the methods, systems, and computer program products provided for herein do not require the storage of a pause position, a last viewed position, or a last played position via the use of media play application programming interfaces (APIs). Further, exemplary embodiments of the methods, systems, and computer program products provided for herein utilize the implementation of server-side adaptive bit rate (ABR) delivery of a DLNA stream to an iOS client as described in U.S. Pat. No. 10,044,466, entitled "Server-Side Adaptive Bitrate Control for DLNA HTTP Streaming Client," filed Jun. 8, 2016, herein incorporated by reference in its entirety. Thus, even if a server is delivering a media asset from a set-top box (STB) recording (e.g., off a STB hard-disk or from a live-off-disk (LOD) buffer), the media stream will appear as if it is "live" and the HLS manifest on the client-side conversion is created as a sliding-window live playlist with no end-tag. In exemplary embodiments, there is no cached "bouquet" of HLS variants for the recorded asset on the STB from which a seek or I-FRAMES-ONLY trickplay by the client can be accessed and thus the HLS streamed media is being created in real-time from a high-resolution, high bitrate source by transcoding and/or transrating it to fit the bandwidth constraints of the DLNA HTTP connection to the client.

System For HLS Trickplay

FIG. 1 is a block diagram illustrating an exemplary system 100 for trickplay in HLS. The system 100 includes client devices 102, a subscriber access device 120, a wide area network (WAN) 130, a subscriber network 140, and a content server 150.

The client device 102 may be a desktop computer, a notebook, a laptop computer, a tablet computer, a handheld device, a smart-phone, a thin client, a television, a set-top-box (STB), or any other electronic device or computing system capable of storing, compiling, and organizing audio, visual, or textual data and receiving and sending that data to and from other computing devices, such as the subscriber access device 120 and the content server 150 via the wide area network (WAN) 130 and/or the subscriber network 140. In embodiments, the client devices 102 request and receive multimedia streams (e.g., an HLS or DLNA media stream) via the subscriber access device 120 or directly from the content server 150 via the WAN 130 and/or the subscriber network 140. While four client devices 102 are illustrated in FIG. 1, it can be appreciated that any number of client devices 102 can be a part of the system 100 including more than or fewer than four client devices 102. In an exemplary embodiment, the client device 102 is a mobile iOS device, but it can be appreciated that a client device 102 running any operating system and receiving an HLS may be used in the system 100. The client devices 102 may be implemented in the computer system 600 illustrated in FIG. 6 using hardware, software executed on hardware, firmware, non-transitory computer readable media having instructions stored thereon, or a combination thereof and may be implemented in one or more computer systems or other processing systems.

The subscriber access device 120 may be a set-top box (STB), a multimedia gateway device, a wireless router including an embedded modem, a wireless network extender, a DLNA multimedia device, and/or any other access point, etc. that provides video, data, and/or voice services to one or more client devices 102 by communicating with the WAN 130 through a connection to the subscriber network 140 (e.g., a local area network (LAN), a wireless local area network (WLAN), a personal area network (PAN), mobile network, high-speed wireless network, etc.). For example, a subscriber can request and receive video, data, and/or voice services through the client device 102 via the subscriber device 120. The subscriber access device 120 may communicate directly with and receive one or more services directly from the subscriber network 140 or the WAN 130. The client device 102 may receive the requested services through a connection to the subscriber access device 120, through a direct connection to the subscriber network 140 (e.g., mobile network), through a direct connection to the WAN 130, or through a connection to the local network 110 that is provided by the subscriber access device 120. The subscriber access device 120 may be implemented in the computer system 600 illustrated in FIG. 6 using hardware, software executed on hardware, firmware, non-transitory computer readable media having instructions stored thereon, or a combination thereof and may be implemented in one or more computer systems or other processing systems.

The content server 150 may be a computing device, a cloud server, or any other electronic device or computing system capable of storing, compiling, and organizing audio, visual, or textual data and receiving and sending that data to and from other computing devices, such as the subscriber access device 120 and the client device 102 directly or via the wide area network (WAN) 130 and/or the subscriber network 140. The content server 150 can include video data stored in a database of any suitable database configuration, such as a relational database, a structured query language (SQL) database, a distributed database, or an object database, etc. Suitable configurations and storage types will be apparent to persons having skill in the relevant. In an exemplary embodiment of the system 100, the content server 150 stores video data such as, but not limited to, movies, television episodes, music videos, or any other on-demand or live video content. The content server 150 may store video data in any suitable format, such as, but not limited to, DLNA video data, and HLS video data, etc. In an exemplary embodiment, the video data may be selected by a user on one or more of the client devices 102 and displayed on a display associated with the one or more client devices 102.

While the components shown in FIG. 1 are shown separate from each other, it should be understood that the various components can be integrated into each other. Further, it can be appreciated that any number of the various components illustrated in FIG. 1 can be included in the system 100.

Figure 2:
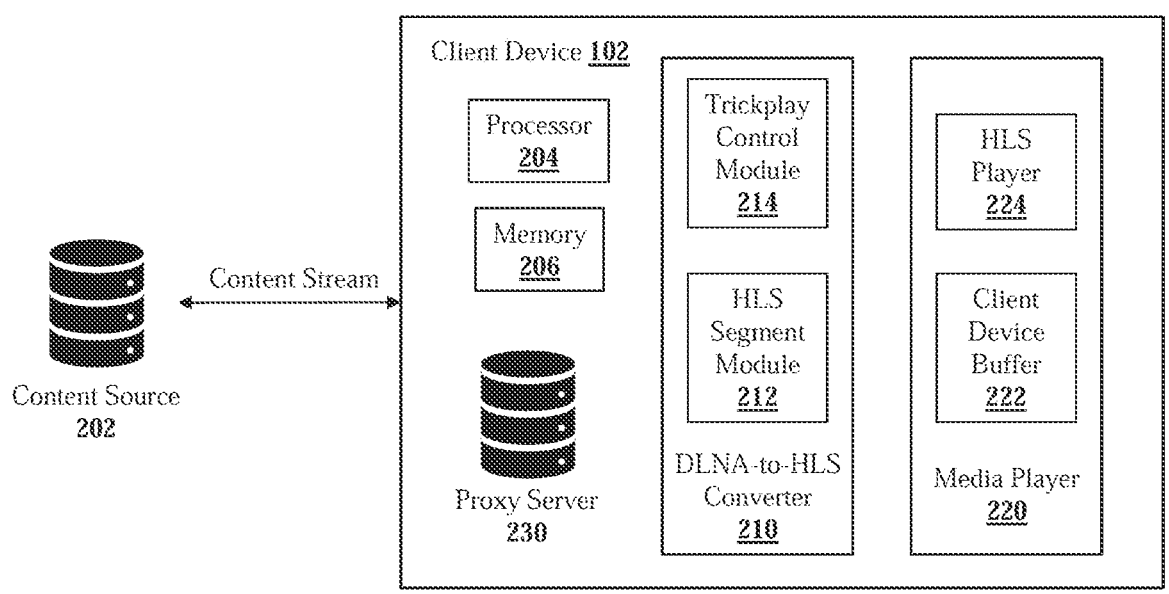
FIG. 2 is a block diagram illustrating a client device in accordance with exemplary embodiments.

FIG. 2. is a block diagram illustrating a client device 102 in accordance with exemplary embodiments.

The client device 102 may include a processor 204, a memory 206, a DLNA-to-HLS converter 210, a media player 220, and a proxy server 230.

The processor 204 may be a special purpose or a general purpose processor device specifically configured to perform the functions discussed herein to be a special purpose computer. The processor 204 unit or device as discussed herein may be a single processor, a plurality of processors, or combinations thereof. Processor devices may have one or more processor "cores." In an exemplary embodiment, the processor 204 is configured to perform the functions associated with the modules of the client device 102 and the method 500 as discussed below.

The memory 206 can be a random-access memory, read-only memory, or any other known memory configurations. Further, the memory 206 can include one or more additional memories including the client device buffer 222 and/or the proxy server 230 in some embodiments. The memory and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device 102. Computer programs, e.g., computer control logic, can be stored in the memory 206.

In embodiments, a video stream (e.g., a DLNA video stream) may be received by a client device 102 from a content source 202 (e.g., the subscriber access device 120, the content server 150, a remote content server within an upstream network, etc.), and the DLNA-to-HLS converter 210 may be configured to segment the PCP-formatted content (e.g., the video stream received from the content source 205) into one or more HLS segments. For example, the DLNA-to-HLS converter 210 may include the HLS segment module 212, and the HLS segment module 212 may segment DLNA content into HLS segments. The HLS segment module 212 may place HLS segments into a buffer 220 (e.g., the client device buffer 222), and the segments may be output to the media player 220 as an HLS stream. The HLS video stream segments may be held locally within a buffer of the media player 220 (e.g., the client device buffer 222) at the client device 102, and retrieval and playback of the segments may be controlled by the HLS player 224.

In embodiments, video services (e.g., a content stream) can be delivered to the client device 102 from the content source 202 via DLNA streaming using hypertext transfer protocol (HTTP). Using DLNA streaming, a single multimedia source file may be encoded and output as a single stream with varying bit rates. The bit rate may indicate the number of bits used per unit of playback time of the associated multimedia content. For example, the bit rate of a stream may be based upon the quality of the content rendition carried by the stream (e.g., higher quality rendition of content is streamed at a higher bit rate while lower quality rendition of content is streamed at a lower bitrate). Factors affecting the quality of content carried by a stream may include resolution, sampling frequency, encoding schemes, compression algorithms, and others. In embodiments, video services can be delivered to a client device 102 via HLS from the content source 202.

In embodiments, a client device 102 may retrieve content from the content source 202 (e.g., the subscriber access device 120, the content server 150, etc.) and may convert the retrieved content (e.g., DLNA content) into HLS content. For example, the client device 102 may operate as a DLNA proxy by bridging and managing the difference in the content received from the content source 202 (e.g., a DLNA source) and the content delivered to a client device 102 (e.g., an HLS sink). It should be understood that the subscriber access device 120, a remote server (e.g., the content server 150) existing at the subscriber network 140 or the WAN 130 level, or other content source may operate as the content source 202 (e.g., a DLNA source or HLS source) for providing DLNA or HLS content to the client device 102. The content server 150 may be an HLS content source, a DLNA content source, or any other content source type, etc. It should be further understood that the client device 102 may communicate with a remote server (e.g., the content server 150) via the subscriber network 140 or the WAN 130, with a remote server (e.g., the content server 150) directly, or with other DLNA or HLS content source directly to receive DLNA or HLS content.

The content stream received by the client device 102 from the content source 202 may be delivered in protected content packet (PCP) block format. The client device 102 may segment the PCP blocks into HLS media segments (e.g., HTTP live streaming (HLS) chunks) and provide the HLS media segments for retrieval by the media player 220 (e.g., an HLS player) at the client device 102. As an example, DLNA content that is aligned on PCP block boundaries may be segmented into HLS media segments. The client device 102 may maintain the HLS media segments within a buffer (e.g., the client device buffer 222) up to a certain duration (e.g., to avoid possible network jitters), and, in some instances, a client device 102 that is retrieving the associated multimedia content may cache a certain duration of the media segments at a local buffer (e.g., the client device buffer 222). In embodiments, the content device 102 may receive an HLS content stream and thus there will be no need to convert the content stream to an HLS stream.

U.S. Pat. No. 9,491,521, entitled "Trick Play Seek Operation for HLS Converted from DTCP," which was filed on Jun. 23, 2014, provides additional description of converting PCP-formatted content into HLS (e.g., HLS) segments and is incorporated herein by reference in its entirety.

In embodiments, a trickplay control module 214 may detect a trickplay request that is received at a video playback device (e.g., client device 102), and may control the HLS segment module 212 accordingly to maintain continuity within the content stream that is delivered to and played back by the media player 220 of the client device 102. For example, the client device 102 may be configured to carry out a pause/resume operation without creating a discontinuity in the content that is segmented from a DLNA video stream into an HLS video stream. Pausing a live content stream is not possible without help of a server (e.g., the content source 202) in any type of stream (e.g., HLS or DLNA, etc.) as the manifest generated by the server, or a proxy for the server, and fed to the client device 102 is a live manifest that does not have an HLS end-list tag (e.g., EXT-X-ENDLIST) until the end of the media asset is reached. Thus, during playback it is very clear that the content end time will be unknown. If a pause is performed on a content stream such that the HLS manifest is not updated at the expected HLS TARGETDURATION intervals, the client device 102 (e.g., an iOS AVPlayer) has been observed to stop playback and issue a failure or error under the assumption that the live server has failed. The client device 102 needs to see a continuously updating live manifest during a live linear asset playback to remain operational. Any Live or DVR/Recorded content playback has some network activity that will be involved such as using a higher-level API depending on the platform or socket level interaction. To solve this issue and prevent disruption of the content stream from the content source 202, exemplary embodiments of the methods, systems, and computer program product provided for herein, pause content playback only at the client device 102 and not at the content source 202; thus, the client device 102 is not sending any command/information to the content source 202 to stop the live content stream to achieve the pause. The client device 102 may use socket level APIs (e.g., BSD socket programing, or net-cat). When a content stream is paused on the client device 102 (e.g., via the trickplay control module 214) and the client device 102 does not receive the content stream from the content source 202, the connection to the content source 202 must remain in an active or on-state. In embodiments, the content source 202 may be kept in an active or on-state using, for example, but not limited to, a ping command or a heart-beat mechanism. The content source 202 will continue to send the content stream and the client device 102 will store the content stream in a socket buffer (e.g., the client device buffer 222) and once the socket buffer is filled, the content source 202 will pause sending the content stream temporarily. In a DLNA streaming protocol, the client device 102 connection to the content source 202 may be maintained via HTTP stalling. HTTP stalling is a feature of an HTTP source that allows the source to detect when a client is no longer accepting data. Once the termination of multimedia requests is detected by the content source 202, the HTTP source (e.g., the content source 202) may suspend production of the corresponding data associated with the multimedia flow until a signal is received from the client device 102 indicating that the client device 102 has capacity to accept more data. In embodiments, where HTTP stalling is supported by a content source 202, the client device 102 may suspend read operations from the content source 202 when a pause request is received from a client device 102 application (e.g., the trickplay control module 214), and by suspending read operations, a stall is initiated at the content source 202, thereby maintaining continuity of the paused content stream. In HTTP stalling, a TCP keepalive protocol keeps the TCP stream connection between the client device 102 and the content source 202 alive; thus, the client device 102 will stop pulling the DLNA stream data from the content source 202 until the client device 102 receive TCP socket buffer fills up and the TCP client (e.g., the client device 102) and content source 202 will both periodically send TCP acknowledgement messages to each other to keep the connection alive.

In addition to keeping the content source 202 in an active state, the client device 102 media player 220 must also be kept in an active state by feeding the content stream to the media player 220 during a pause state if the media player 220 is requesting manifests and data. If the media player 220 is not kept in an active state, the client device 102 will determine that the content source 202 has failed during the HTTP stalling event and the client device 102 will stop receiving the content stream. In order to keep the client device 102 media player 220 in an active state, a DLNA-to-HLS proxy server (e.g., the proxy server 230) can send live HLS manifests that advertise continuously changing HLS chunk URIs for chunk data that is actually not changing. The client DLNA-to-HLS proxy (e.g., the proxy server 230) can retain a storage of the most recent contemporaneous received DLNA stream data from the content source 202 prior to pausing, create HLS chunks from this data and continuously rename them in the manifests, as the media player 220 requests new manifests and chunks. For example, in an iOS media player (e.g., the media player 220), an API called "preferredForwardBufferDuration" can be set to, e.g., 60 seconds, so that the media player 220 will buffer for 60 seconds. When a pause trickplay command is received via the trickplay control module 214 and the content stream is paused, the content stream is transmitted to the media player 220 for 60 seconds and then an implicit pause is executed. Then upon a resume trickplay command, the media player 220 will play the first 60 seconds of the content stream and by the time the first 60 seconds has played, the full content stream will be restored and data flow between content source 202 and the client device 102 will resume smoothly. In embodiments, the proxy server 230 may be an Array that stores video data as objects (e.g., chunks) which may be stored and deleted in sequence. For example, the content stream may be stored in chunks such as, video-data obj1, video-data obj2, etc., and once the last chunk in the buffer sequence is received, e.g., video-obj10, the video-obj1 chunk is deleted creating a circular FIFO-like chunk buffer.

Figure 3:
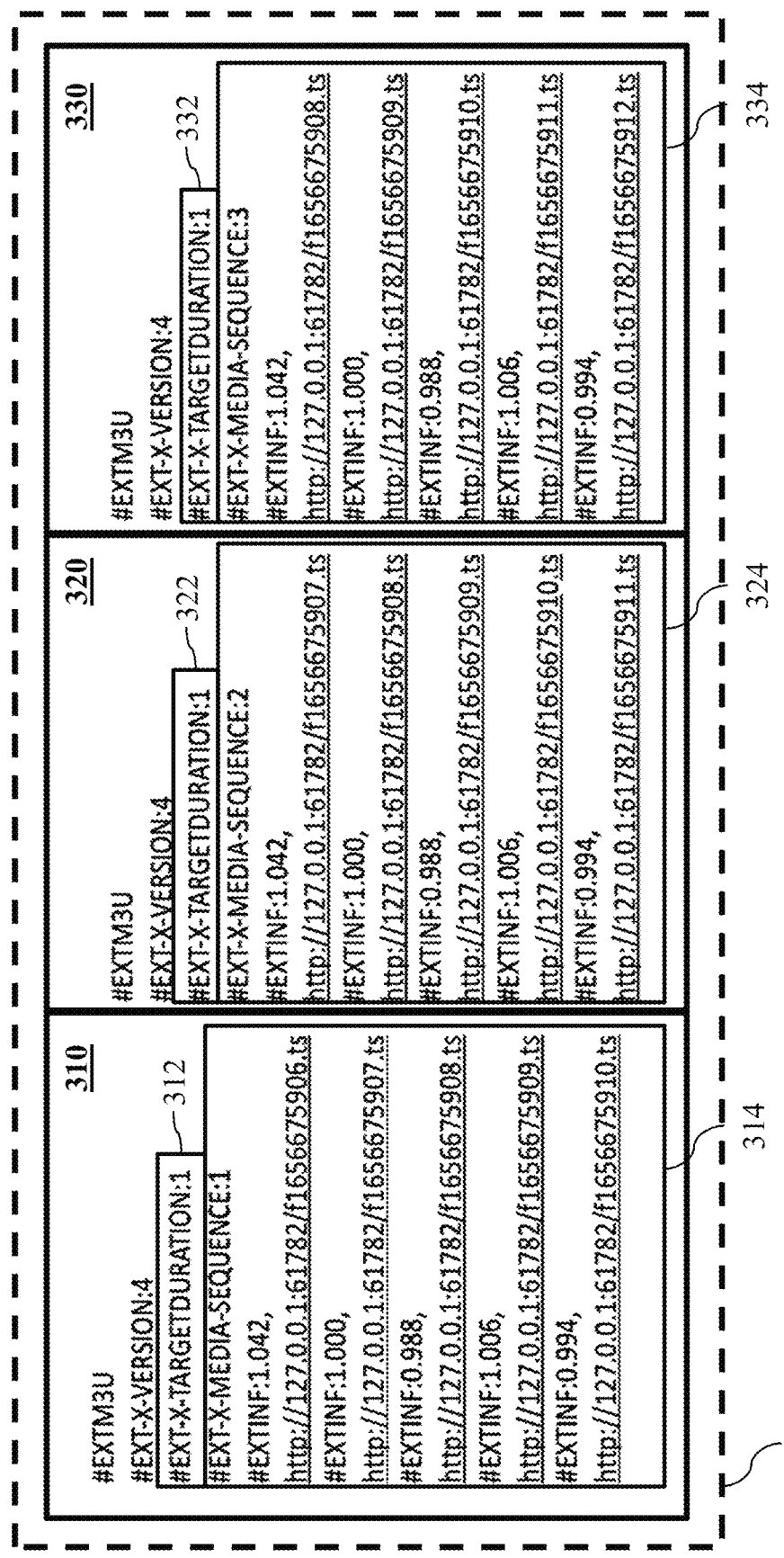
FIG. 3 is a block diagram illustrating an HLS manifest file in accordance with exemplary embodiments.
Figure 4:
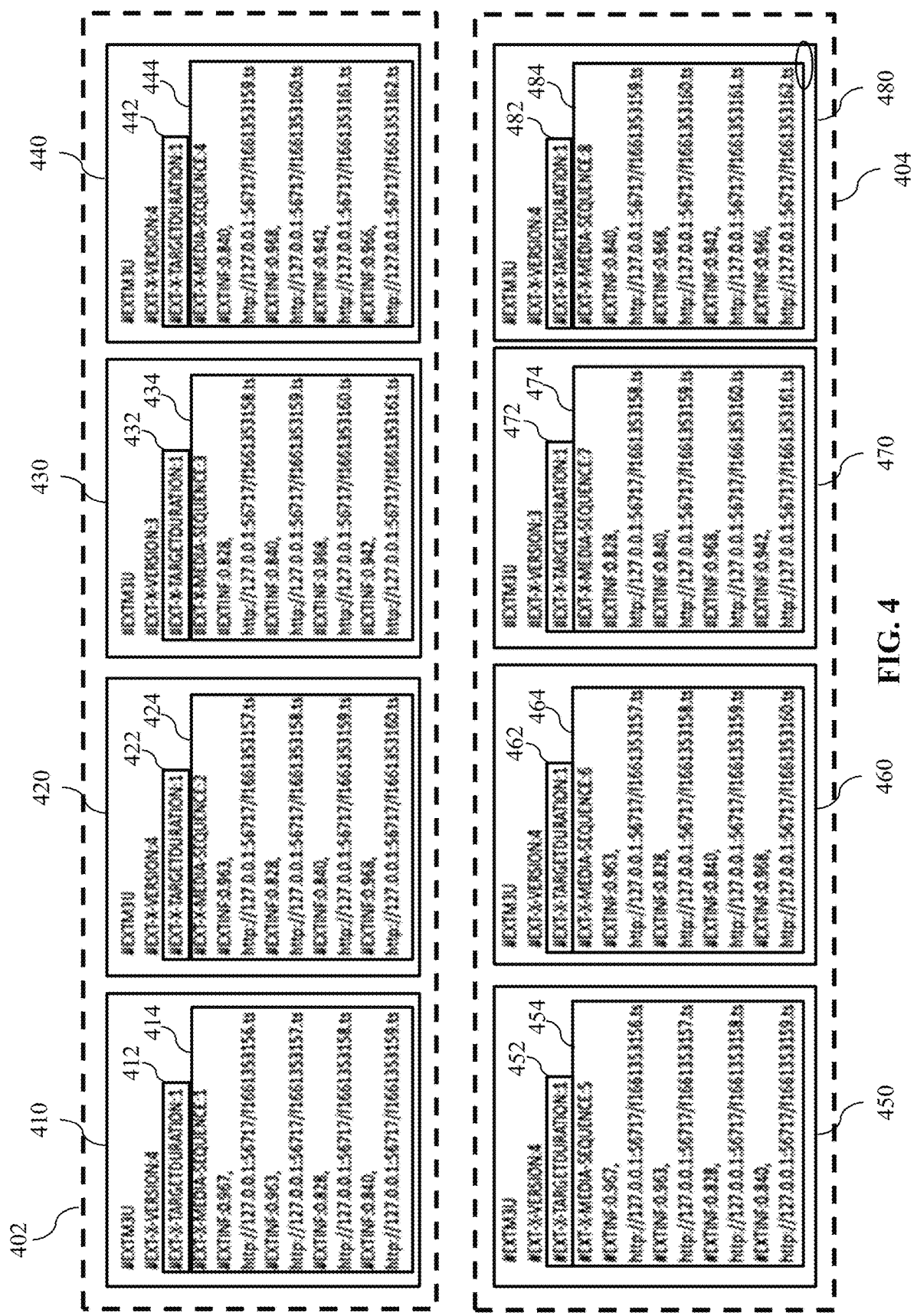
FIG. 4 is a block diagram illustrating modified HLS manifests in accordance with exemplary embodiments.

FIG. 3 is a block diagram illustrating an example HLS manifest 302 created by the proxy server 230 from the content stream data and stored in the proxy server 230. The HLS manifest 302 consists of three manifest files 310, 320, 330 each containing respective video transport stream (TS) files 314, 324, 334 (e.g., HLS chunk uniform resource identifies (URIs)) identified by sequence numbers 312, 322, 332. As illustrated, the TS files 314, 324, 334 of the three manifest files 310, 320, 330 each contain TS files in increasing number with the lowest number TS file dropping off in a subsequent manifest file and a new higher number TS file being added. For example, the manifest file 310 contains consecutively numbered TS files 314 with the first TS file 314 having a URI ending in –906.ts and the last TS file 314 having a URI ending in –910.ts, and the manifest file 320 contains consecutively numbered TS files 324 with the first TS file 324 having a URI ending in –907.ts and the last TS file 324 having a URI ending in –911.ts. While the manifest files 310, 320, and 330 contain TS files 314, 324, 334, with consecutive URI numbers, the TS files 314, 324, 334 can be in any order, so as long as each manifest file 310, 320, and 330 contains a different sequence number 312, 322, 332 and at least one different TS file than the manifest file preceding it. Turning now to FIG. 4, a block diagram illustrating an HLS manifest 402 and a modified HLS manifest 404. The HLS manifest 402 contains manifest files 410, 420, 430, 440, having sequence numbers 412, 422, 432, 442 and TS files 414, 424, 434, 444, respectively. The modified HLS manifest 404 contains manifest files 450, 460, 470, 480, having sequence numbers 452, 462, 472, 482 and TS files 454, 464, 474, 484, respectively. The HLS manifest 402 is similar to the modified HLS manifest 404 as the TS files 414, 424, 434, 444 of the HLS manifest 402 are the same as the TS files 454, 464, 474, 484 of the modified HLS manifest 404. However, the sequence numbers 412, 422, 432, 442 of the HLS manifest 402 and the sequence numbers 452, 462, 472, 482 of the modified HLS manifest 404 continue in increasing order. The proxy server 230 transmits the HLS manifest files 410, 420, 430, 440 of the HLS manifest 402 to the client device 102 media player 220 followed by the modified HLS manifest files 450, 460, 470, 480 of the HLS manifest 404. Thus, the media player 220 is kept in an active state even though the HLS manifest 402 contains the same TS files as the modified HLS manifest 404 because the sequence numbers keep changing. The proxy server 230 may repeat alternatively transmitting the HLS manifest files 410, 420, 430, 440 of the HLS manifest 402 and the modified HLS manifest files 450, 460, 470, 480 of the HLS manifest 404 to the media player 220 until a resume trickplay command is received by the client device 102.

When playback of the content stream is resumed, the proxy server 230 updates the manifest with a combination of these cached repeated chunks and new chunks created from the stalled receive client socket buffer (e.g., the client device buffer 222) to get continuous playback from the pause position and avoid a jump in playback to a live point.

On resume (e.g., a user trickplay resume command) the client device 102 can start receiving the data from the socket (e.g., the client device buffer 222), since the TCP connection to the content source 202 is still in an active state. At first the client device buffer 222 will transmit all the buffered data to the proxy server 230, and once the client device buffer 222 is empty, the client device 102 will start pulling TCP data from the content source 202 over the network connection. In response, the content source 202 is notified internally that its send socket buffer memory is being drained and the content source 202 will then restart sending the content stream from the position where it had been stopped.

Exemplary Method for HLS Trickplay

Figure 5A:
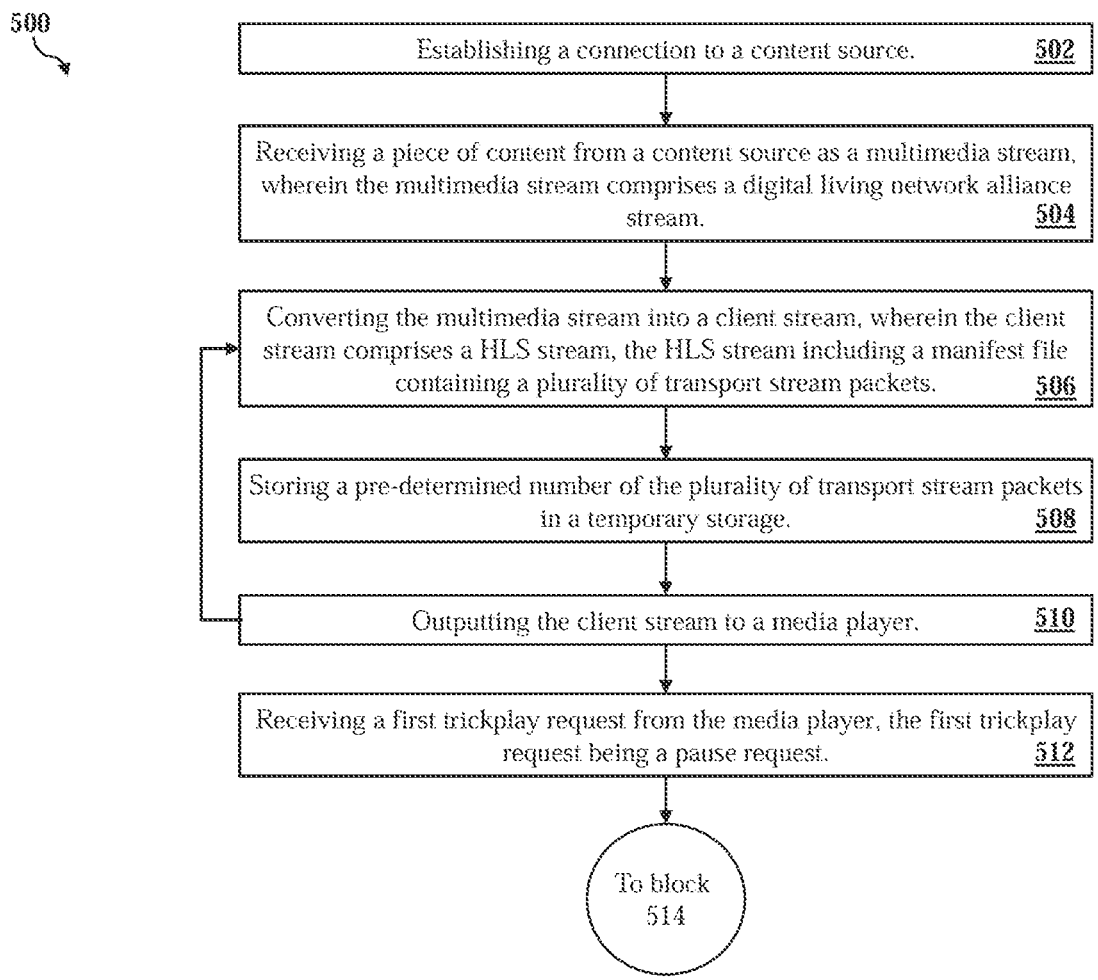
FIGS. 5A-5C is a flow chart illustrating exemplary methods for trickplay in HLS in accordance with exemplary embodiments.
Figure 5B:
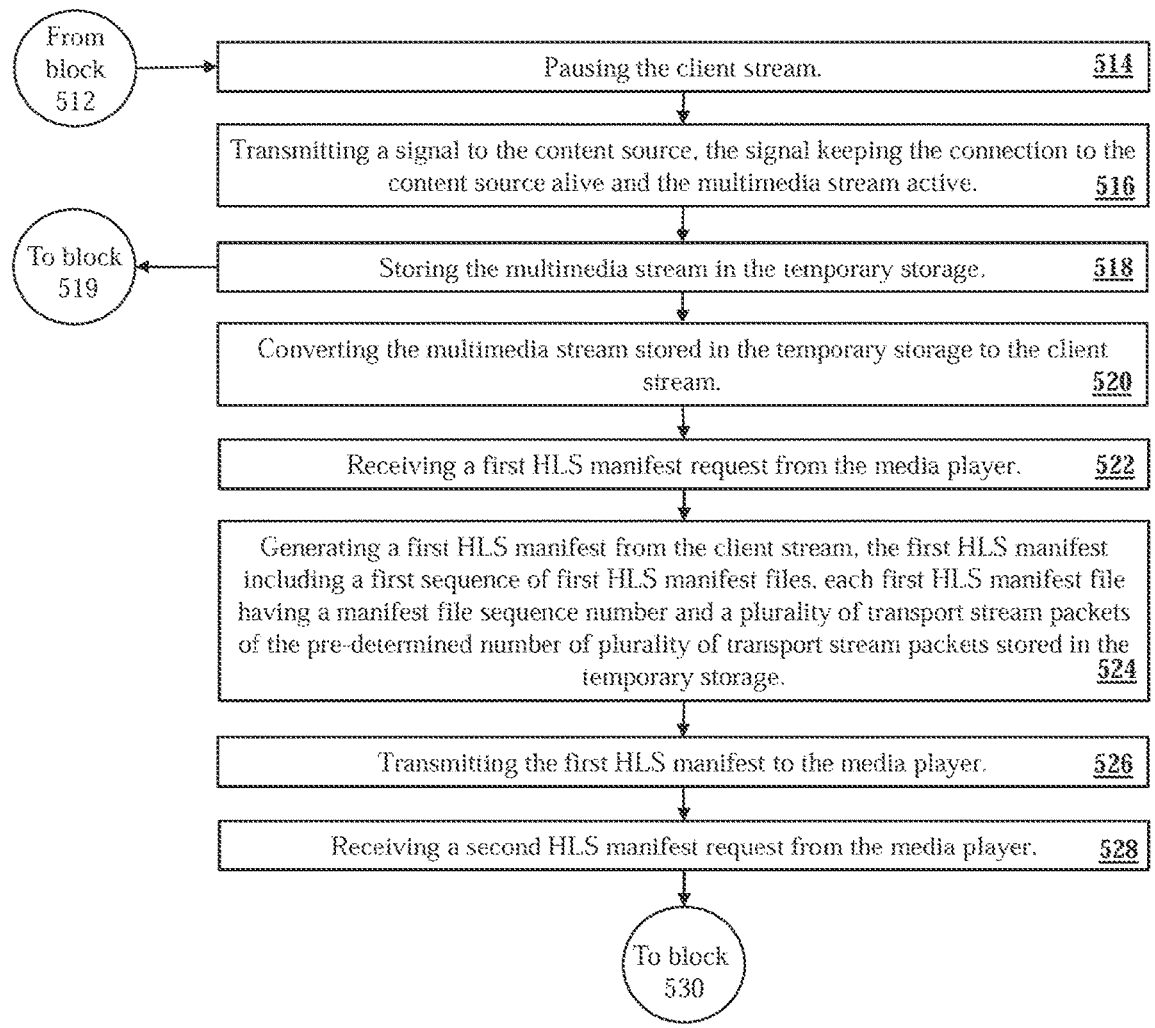
Figure 5C:
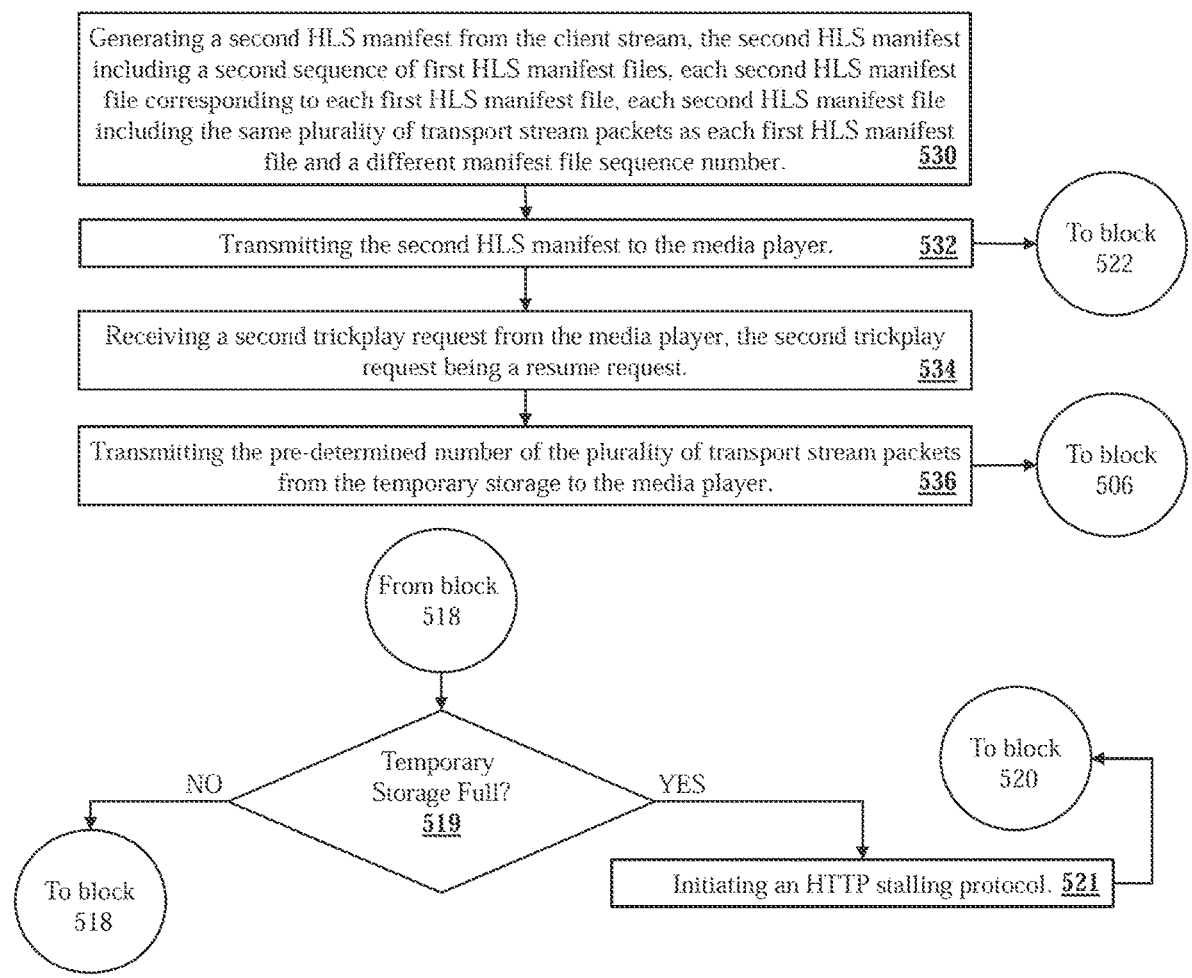

FIGS. 5A-5C illustrates a flow chart of an exemplary method 500 for HLS trickplay in accordance with exemplary embodiments. The method 500 provides a seamless transition in an HLS content stream during a pause/resume trickplay operation.

In an exemplary embodiment, the method 500 can include block 502 for establishing a connection between the client device 102 and the content source 202 (e.g., the subscriber access device 120, the content server 150, or any other suitable content source, etc.). For example, the content source 202 may be, but is not limited to, a DLNA multimedia device, an HLS multimedia device, a set-top-box, a multimedia gateway device, a wireless router including an embedded modem, and a wireless network extender. The connection between the client device 102 and the content source 202 may be a direct wired connection, a direct wireless connection (e.g., via the WAN 130 and/or subscriber network 140), or an indirect wired or wireless connection such as, but not limited to, via the subscriber access device 120.

In an exemplary embodiment, the method 500 can include block 504 for receiving a piece of content by the client device 102 from the content source 202 as a multimedia stream. The multimedia stream may be, but is not limited to, a DLNA media stream, an HLS media stream, or any other suitable multimedia stream capable of being transmitted to and received by the client device 102.

In an exemplary embodiment, the method 500 can include block 506 for converting the multimedia stream into a client stream. The client stream may be, for example, an HLS stream including a manifest file containing a plurality of transport stream packets. In an exemplary embodiment, the multimedia stream is a DLNA media stream and the DLNA-to-HLS converter 210 converts the DLNA media stream to an HLS media stream.

In an exemplary embodiment, the method 500 can include block 508 for storing a pre-determined number of the plurality of transport stream packets in a temporary storage (e.g., the client device buffer 222 or the proxy server 230). The temporary storage may be a socket buffer and may store up to sixty seconds of transport stream packets or any suitable amount of transport stream packets.

In an exemplary embodiment, the method 500 can include block 510 for outputting the client stream from the to the media player 220. For example, but not limited to the DLNA-to-HLS converter 210 may output the client stream (e.g., the HLS stream) to the media player 220 via the HLS segment module 212. In an exemplary embodiment, the media player 220 is an iOS device media player or any other media player requiring an HLS client stream.

Blocks 506-510 are repeated in normal content streaming until a trickplay command is received by the media player 220 or the multimedia stream has ended.

In an exemplary embodiment, the method 500 can include block 512 for receiving a first trickplay request from the media player 220. The first trickplay request being a pause request of the HLS client stream.

In an exemplary embodiment, the method 500 can include block 514 for pausing the client stream (e.g., via the trickplay control module 214) on the client device 102. Pausing the client stream on the client device 102 causes a display associated with the client device 102 to stop the client stream at the time the pause trickplay request is received by the media player 220. In example embodiments, while the client stream is paused on the display, the client device 102 and the content source 202 maintain an active connection.

In an exemplary embodiment, the method 500 can include block 516 for transmitting a signal by the client device 102 to the content source 202 to keep the connection to the content source 202 alive and the multimedia stream active.

In an exemplary embodiment, the method 500 can include block 518 for storing, by the client device 102, the multimedia stream in the temporary storage (e.g., the client device buffer 222 and/or the proxy server 230). For example, the client device may store the DLNA stream in a socket buffer (e.g., the client device buffer 222). For example, the temporary storage (e.g., the client device buffer 222 and/or the proxy server 230) may be a socket buffer capable of storing up to sixty seconds of multimedia stream data (e.g., transport stream packets).

In an exemplary embodiment, the method 500 can include block 519 for determining if the temporary storage (e.g., the client device buffer 222) is full. If the temporary storage is full, the method 500 may proceed to block 521 for initiating an HTTP stalling protocol before proceeding to block 520. If the temporary storage is not full, the method 500 may proceed to continue storing the multimedia stream in the temporary storage.

In an exemplary embodiment, the method 500 can include block 520 for converting, by the client device 102, the multimedia stream (e.g., the DLNA stream) stored in the temporary storage to the client stream (e.g., the HLS stream) via the DLNA-to-HLS converter 210.

In an exemplary embodiment, the method 500 can include block 522 for receiving a first HLS manifest request from the media player 220. For example, the media player 220 may transmit a request for an HLS manifest to the proxy server 230 or directly to the content source 202.

In an exemplary embodiment, the method 500 can include block 524 for generating, by the client device 102, a first HLS manifest from the client stream (e.g., via the proxy server 230). The first HLS manifest including a first sequence of first HLS manifest files with each first HLS manifest file having a manifest file sequence number and a plurality of transport stream packets of the pre-determined number of plurality of transport stream packets stored in the temporary storage. Each the manifest files of the first sequence of first HLS may include, e.g., at least three seconds of client stream data. The client device 102 may identify a timestamp of a last frame of the client stream and identify the timestamp in the stored plurality of transport stream packets stored in the temporary storage to generate the first HLS manifest.

In an exemplary embodiment, the method 500 can include block 526 for transmitting the first HLS manifest to the media player 220 (e.g., via proxy server 230).

In an exemplary embodiment, the method 500 can include block 528 for receiving a second HLS manifest request from the media player 220. For example, the media player 220 may transmit a second request for an HLS manifest to the proxy server 230 or directly to the content source 202.

In an exemplary embodiment, the method 500 can include block 530 for generating, by the client device 120, a second HLS manifest from the client stream (e.g., via the proxy server 230). The second HLS manifest including a second sequence of first HLS manifest files, each second HLS manifest file corresponding to each first HLS manifest file with each second HLS manifest file including the same plurality of transport stream packets as each first HLS manifest file and a different manifest file sequence number. For example, the first sequence of the first HLS manifest files may include three sequences named sequence 1, sequence 2, and sequence 3, and the second sequence of the first HLS manifest files may include three sequences named sequence 4, sequence 5, and sequence 6. The transport stream packets (e.g., the client stream data) of sequences 1, 2, and 3 are the same as the transport stream packets (e.g., the client stream data) of sequences 4, 5, and 6, respectively.

In an exemplary embodiment, the method 500 can include block 532 for transmitting the second HLS manifest to the media player 220 (e.g., via proxy server 230).

Blocks 522-532 may be repeated (e.g., alternately transmitting the first HLS manifest and the second HLS manifest) until a resume trickplay command is received by the media player 220.

In an exemplary embodiment, the method 500 can include block 534 for receiving, by the client device, a second trickplay request from the media player 220. The second trickplay request being a resume request of the HLS client stream.

In an exemplary embodiment, the method 500 can include block 536 for transmitting, by the client device 102, the pre-determined number of the plurality of transport stream packets from the temporary storage (e.g., the client device buffer 222 or the proxy server 230 to the media player 220.

In exemplary embodiment, the method 500 proceeds to block 504 from block 536 and repeats blocks 504-510 until another trickplay command is received by the media player 220 or the multimedia stream ends.

Computer System Architecture

Figure 6:
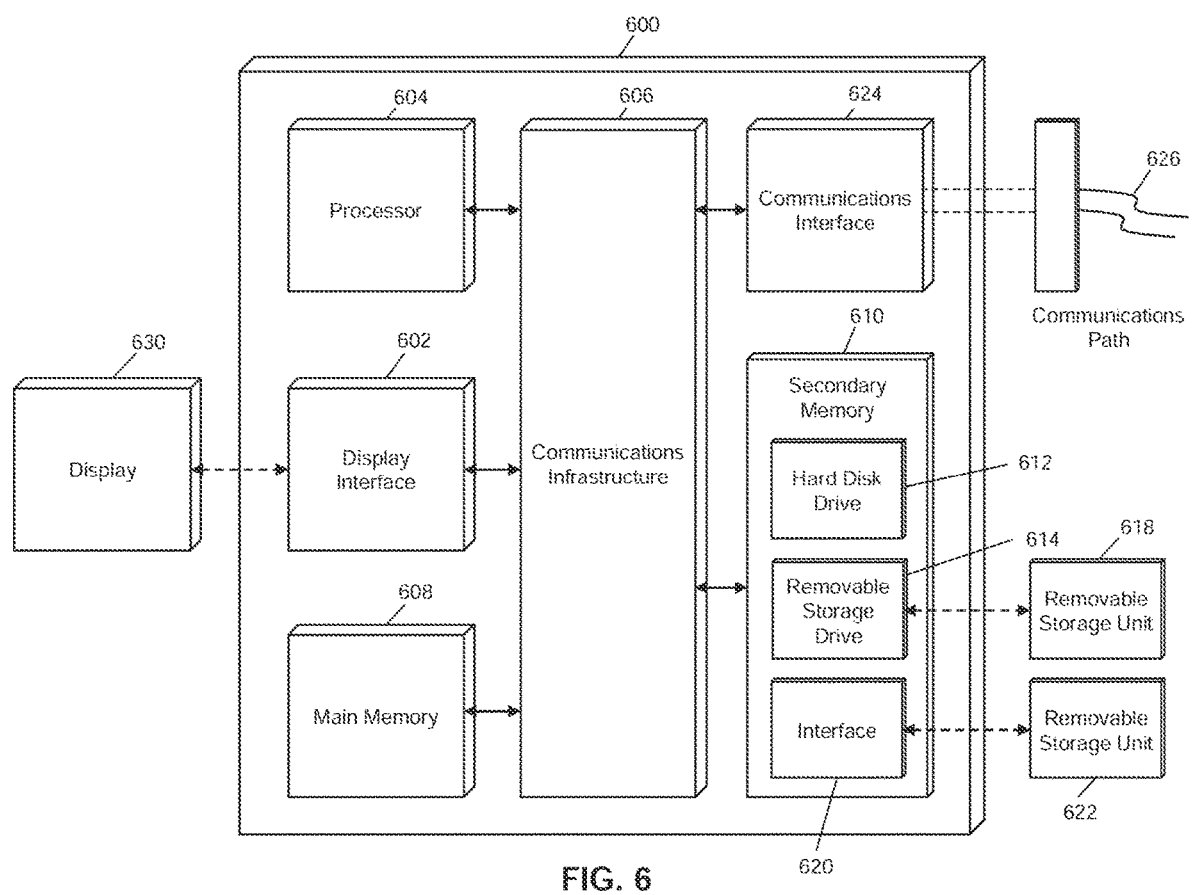
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the client devices 102, the subscriber access device 120, and/or the content server 150 of FIG. 1, and the content source 205 of FIG. 2 may be implemented in the computer system 600 using hardware, software executed on hardware, firmware, non-transitory computer readable media having instructions stored thereon, or a combination thereof and may be implemented in one or more computer systems or other processing systems. Hardware, software, or any combination thereof may embody modules, such as the HLS segment module 212 and the trickplay control module 214 modules of FIG. 2.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 5A-5C, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines, such as the modules 212-214, configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for authentication of a client device using a hash chain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for trickplay in HTTP live streaming (HLS), the method comprising:

establishing a connection to a content source;

receiving a piece of content from a content source as a multimedia stream, wherein the multimedia stream comprises a digital living network alliance stream;

converting the multimedia stream into a client stream, wherein the client stream comprises a HLS stream, the HLS stream including a manifest file containing a plurality of transport stream packets;

storing a pre-determined number of the plurality of transport stream packets in a temporary storage, wherein the temporary storage has a limited storage capacity;

outputting the client stream to a media player;

receiving a first trickplay request from the media player, the first trickplay request being a pause request;

in response to the first trickplay request:
pausing the client stream;
transmitting a signal to the content source, the signal keeping the connection to the content source alive and the multimedia stream active;
storing the multimedia stream in the temporary storage; and
in response to the temporary storage being full, initiating an HTTP stalling protocol.

2. The method of claim 1, wherein the temporary storage is a socket buffer.

3. The method of claim 1, including:
converting the multimedia stream stored in the temporary storage to the client stream;
receiving a first HLS manifest request from the media player;
generating a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
transmitting the first HLS manifest to the media player;
receiving a second HLS manifest request from the media player;
generating a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
transmitting the second HLS manifest to the media player.

4. The method of claim 3, wherein each manifest file of the first sequence of first HLS manifest files and the second sequence of second HLS manifest files include at least three seconds of client stream data.

5. The method of claim 3, wherein generating the first HLS manifest and the second HLS manifest includes:
identifying a timestamp of a last frame of the client stream; and
identifying the timestamp in the stored plurality of transport stream packets stored in the temporary storage.

6. The method of claim 1, including:
receiving a second trickplay request from the media player, the second trickplay request being a resume request; and
transmitting the pre-determined number of the plurality of transport stream packets from the temporary storage to the media player.

7. The method of claim 1, wherein the media player is an iOS device, a tvOS device, or an iPadOS device.

8. The method of claim 1, wherein the temporary storage stores up to sixty seconds of transport stream packets.

9. The method of claim 1, wherein the content source is one of the group consisting of: a DLNA multimedia device, an HLS multimedia device, a set-top-box, a multimedia gateway device, a wireless router including an embedded modem, and a wireless network extender.

10. An apparatus comprising:
an interface configured to:
establish a connection to a content source; and
receive a piece of content from a content source as a multimedia stream, wherein the multimedia stream comprises a digital living network alliance stream; and
one or modules configured to:
convert the multimedia stream into a client stream, wherein the client stream comprises a HLS stream, the HLS stream including a manifest file containing a plurality of transport stream packets;
store a pre-determined number of the plurality of transport stream packets in a temporary storage, wherein the temporary storage has a limited storage capacity;
output the client stream to a media player;
receive a first trickplay request from the media player, the first trickplay request being a pause request;
in response to the first trickplay request:
pause the client stream;
transmit a signal to the content source, the signal keeping the connection to the content source alive and the multimedia stream active;
store the multimedia stream in the temporary storage; and
in response to the temporary storage being full, initiate an HTTP stalling protocol.

11. The apparatus of claim 10, wherein the temporary storage is a socket buffer.

12. The apparatus of claim 10, including:
the one or more modules configured to:
convert the multimedia stream stored in the temporary storage to the client stream;
receive a first HLS manifest request from the media player;
generate a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
transmit the first HLS manifest to the media player;
receive a second HLS manifest request from the media player;
generate a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
transmit the second HLS manifest to the media player.

13. The apparatus of claim 12, wherein each manifest file of the first sequence of first HLS manifest files and the second sequence of second HLS manifest files include at least three seconds of client stream data.

14. The apparatus of claim 12, wherein generating the first HLS manifest and the second HLS manifest includes:
- identifying a timestamp of a last frame of the client stream; and
- identifying the timestamp in the stored plurality of transport stream packets stored in the temporary storage.

15. The apparatus of claim 10, including:
- receiving a second trickplay request from the media player, the second trickplay request being a resume request; and
- transmitting the pre-determined number of the plurality of transport stream packets from the temporary storage to the media player.

16. The apparatus of claim 10, wherein the media player is an iOS device, a tvOS device, or an iPadOS device.

17. The apparatus of claim 10, wherein the temporary storage stores up to sixty seconds of transport stream packets.

18. The apparatus of claim 10, wherein the content source is one of the group consisting of: a DLNA multimedia device, an HLS multimedia device, a set-top-box, a multimedia gateway device, a wireless router including an embedded modem, and a wireless network extender.

19. A computer program product for trickplay in HTTP live streaming (HLS), the computer program product comprising:
- a non-transitory computer-readable storage medium having program instructions embodied therewith, the program instructions executable by a computer to cause the computer to perform a method, comprising:
  - establishing a connection to a content source;
  - receiving a piece of content from a content source as a multimedia stream, wherein the multimedia stream comprises a digital living network alliance stream;
  - converting the multimedia stream into a client stream, wherein the client stream comprises a HLS stream, the HLS stream including a manifest file containing a plurality of transport stream packets;
  - storing a pre-determined number of the plurality of transport stream packets in a temporary storage, wherein the temporary storage has a limited storage capacity;
  - outputting the client stream to a media player; and
  - receiving a first trickplay request from the media player, the first trickplay request being a pause request;
  - in response to the first trickplay request:
    - pausing the client stream;
    - transmitting a signal to the content source, the signal keeping the connection to the content source alive and the multimedia stream active;
    - storing the multimedia stream in the temporary storage; and
    - in response to the temporary storage being full, initiating an HTTP stalling protocol.

20. The computer program product of claim 19, wherein the temporary storage is a socket buffer.

21. The computer program product of claim 19, wherein the method includes:
- converting the multimedia stream stored in the temporary storage to the client stream;
- receiving a first HLS manifest request from the media player;
- generating a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
- transmitting the first HLS manifest to the media player;
- receiving a second HLS manifest request from the media player;
- generating a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
- transmitting the second HLS manifest to the media player.

22. The computer program product of claim 21, wherein each manifest file of the first sequence of first HLS manifest files and the second sequence of second HLS manifest files include at least three seconds of client stream data.

23. The computer program product of claim 21, wherein generating the first HLS manifest and the second HLS manifest includes:
- identifying a timestamp of a last frame of the client stream; and
- identifying the timestamp in the stored plurality of transport stream packets stored in the temporary storage.

24. The computer program product of claim 19, wherein the method includes:
- receiving a second trickplay request from the media player, the second trickplay request being a resume request; and
- transmitting the pre-determined number of the plurality of transport stream packets from the temporary storage to the media player.

25. The computer program product of claim 19, wherein the media player is an iOS device, a tvOS device, or an iPadOS device.

26. The computer program product of claim 19, wherein the temporary storage stores up to sixty seconds of transport stream packets.

27. The computer program product of claim 19, wherein the content source is one of the group consisting of: a DLNA multimedia device, an HLS multimedia device, a set-top-box, a multimedia gateway device, a wireless router including an embedded modem, and a wireless network extender.

28. A method for trickplay in HTTP live streaming (HLS), the method comprising:
- establishing a connection to a content source;
- receiving a piece of content from a content source as a multimedia stream, wherein the multimedia stream comprises a digital living network alliance stream;
- converting the multimedia stream into a client stream, wherein the client stream comprises a HLS stream, the HLS stream including a manifest file containing a plurality of transport stream packets;
- storing a pre-determined number of the plurality of transport stream packets in a temporary storage;
- outputting the client stream to a media player;
- receiving a first trickplay request from the media player, the first trickplay request being a pause request;
- in response to the first trickplay request:
  - pausing the client stream;
  - transmitting a signal to the content source, the signal keeping the connection to the content source alive and the multimedia stream active;
  - storing the multimedia stream in the temporary storage; and converting the multimedia stream stored in the temporary storage to the client stream;
receiving a first HLS manifest request from the media player;
generating a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
transmitting the first HLS manifest to the media player;
receiving a second HLS manifest request from the media player;
generating a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
transmitting the second HLS manifest to the media player.

29. An apparatus comprising:
an interface configured to:
  establish a connection to a content source;
  receive a piece of content from a content source as a multimedia stream, wherein the multimedia stream comprises a digital living network alliance stream; and
one or modules configured to:
  convert the multimedia stream into a client stream, wherein the client stream comprises a HLS stream, the HLS stream including a manifest file containing a plurality of transport stream packets;
  store a pre-determined number of the plurality of transport stream packets in a temporary storage;
  output the client stream to a media player;
  receive a first trickplay request from the media player, the first trickplay request being a pause request;
  in response to the first trickplay request:
    pause the client stream;
    transmit a signal to the content source, the signal keeping the connection to the content source alive and the multimedia stream active;
    store the multimedia stream in the temporary storage;
    convert the multimedia stream stored in the temporary storage to the client stream;
  receive a first HLS manifest request from the media player;
  generate a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
  transmit the first HLS manifest to the media player;
  receive a second HLS manifest request from the media player;
  generate a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
  transmit the second HLS manifest to the media player.

30. A computer program product for trickplay in HTTP live streaming (HLS), the computer program product comprising:
a non-transitory computer-readable storage medium having program instructions embodied therewith, the program instructions executable by a computer to cause the computer to perform a method, comprising:
establishing a connection to a content source;
receiving a piece of content from a content source as a multimedia stream, wherein the multimedia stream comprises a digital living network alliance stream;
converting the multimedia stream into a client stream, wherein the client stream comprises a HLS stream, the HLS stream including a manifest file containing a plurality of transport stream packets;
storing a pre-determined number of the plurality of transport stream packets in a temporary storage;
outputting the client stream to a media player;
receiving a first trickplay request from the media player, the first trickplay request being a pause request;
in response to the first trickplay request:
  pausing the client stream;
  transmitting a signal to the content source, the signal keeping the connection to the content source alive and the multimedia stream active;
  storing the multimedia stream in the temporary storage;
  converting the multimedia stream stored in the temporary storage to the client stream;
receiving a first HLS manifest request from the media player;
generating a first HLS manifest from the client stream, the first HLS manifest including a first sequence of first HLS manifest files, each first HLS manifest file having a manifest file sequence number and a plurality of transport stream packets of the pre-determined number of plurality of transport stream packets stored in the temporary storage;
transmitting the first HLS manifest to the media player;
receiving a second HLS manifest request from the media player;
generating a second HLS manifest from the client stream, the second HLS manifest including a second sequence of first HLS manifest files, each second HLS manifest file corresponding to each first HLS manifest file, each second HLS manifest file including the same plurality of transport stream packets as each first HLS manifest file and a different manifest file sequence number; and
transmitting the second HLS manifest to the media player.

* * * * *